United States Patent [19]

Watanabe et al.

[11] 4,441,798

[45] Apr. 10, 1984

[54] CAMERA HAVING A LIQUID CRYSTAL FOCUSING SCREEN

[75] Inventors: Koji Watanabe; Yoshihiro Higuchi; Michio Yagi; Kazuo Shiozawa, all of Hachioji, Japan

[73] Assignee: Konishiroku Photo Industry Co., Ltd., Tokyo, Japan

[21] Appl. No.: 433,021

[22] Filed: Oct. 6, 1982

Related U.S. Application Data

[63] Continuation of Ser. No. 186,349, Sep. 12, 1980, abandoned.

[30] Foreign Application Priority Data

Sep. 14, 1979 [JP] Japan .............................. 54/118398

[51] Int. Cl.³ .............................................. G03B 7/00
[52] U.S. Cl. ...................................... 354/483; 354/200
[58] Field of Search ................... 354/23 D, 42, 53, 59, 354/60 E, 200, 201, 289

[56] References Cited

U.S. PATENT DOCUMENTS

| | | | |
|---|---|---|---|
| 3,713,369 | 1/1973 | Fuji | 354/23 R |
| 4,140,378 | 2/1979 | Suzuki et al. | 354/53 |
| 4,142,786 | 3/1979 | Suzuki et al. | 354/53 X |
| 4,208,115 | 6/1980 | Proske | 354/201 |

Primary Examiner—John Gonzales
Attorney, Agent, or Firm—Jordan B. Bierman; Linda Bierman

[57] ABSTRACT

A camera which includes a liquid crystal focusing screen and an exposure control circuit that measures light reflected from the subject to be photographed after its passage through the liquid crystal screen is further provided with a circuit for compensating the light value determined by the exposure control circuit when operating voltage is not applied to the focusing screen so as to thereby compensate the amount of light measured through the screen when the nonapplication of operating voltage to the focusing screen causes the screen to transmit light therethrough less readily than when operating voltage is applied thereto.

2 Claims, 11 Drawing Figures

CAMERA HAVING A LIQUID CRYSTAL FOCUSING SCREEN

This application is a continuation of application Ser. No. 186,369, filed Sept. 12, 1980, abandoned.

BACKGROUND OF THE INVENTION

This invention relates to a camera and, more particularly, to one in which a current effect mode liquid crystal cell is used as a focusing screen.

The viewfinder of a camera can present a variety of information to the user, including an indication of the photographing composition, focusing information, data indicative of photographing conditions, etc., and various methods to fulfill such roles have been proposed. Focusing methods are generally divided broadly into the two categories of a matte surface focusing screen and a transparent focusing screen. In the former, the light-diffusing nature of the surface of ground glass or other material is utilized and the viewfinder image of the subject to be photographed becomes dim with the reduction in light intensity on the diffusion surface, resulting in focusing difficulties and interfering with decisions in respect of composition.

As for the transparent focusing screen, several arrangements including a split-image method, a microprism method and a cross-hair method are currently utilized. In these arrangements, focusing is possible only on a specific part (usually the central area of the field of view) of the finder; on the remainder of the field of view, differences between the in-focus and out-of-focus states are unclear. In addition, a shadow tends appears on the focusing part or area of the screen as the lens is stopped down, whereby focusing accuracy falls.

In order to provide in the finder an indication of photographing conditions, such elements as a meter indicator, a lamp, an LED and an indication plate have been arranged near the focusing screen, on the pentagonal prism surface and in the clearance space between the focusing screen and the pentagonal prism. This permits the f-stop value, the shutter speed, blur and/or exposure information and warnings of low-high-luminance to be indicated enabling more clear and properly exposed photographs to be produced. Each of these known methods, however, has required a complicated indication system.

Presently, liquid crystals are divided into two types—one is the electric field effect mode liquid crystal that works with only a dielectric torque produced by an interaction between a dielectric anisotrophy of the liquid crystal molecules and an electric field, while the other is the current effect mode liquid crystal that operates in accordance with both an electrical conduction torque based upon an electrical conductivity anisotrophy of the liquid crystal molecules and the aforesaid dielectric torque. An electric field effect mode liquid crystal is further classified into TN, DAP, HAN, PT and GH modes according to an orientation characteristic of the liquid crystal molecules by a dielectric torque. In liquid crystals of the TN, DAP and HAN modes, an indication is made with an attached polarizing plate and utilizing rotary polarization of the liquid crystal molecule orientation. In a GH mode liquid crystal, an indication is made by light absorption of dyes added to the crystal in very small amounts. In a PT mode liquid crystal, an indication is made (similarly to a current effect mode liquid crystal) by light dispersion and this light dispersion occurs because the screw axis of the cholesteric liquid crystal upon which an electric field is impressed is not uniformly perpendicular to the electrode and becomes a group with an inclination. However, a liquid crystal with a screw axis of a certain pitch absorbs visible rays and it is therefore necessary to use for the focusing screen liquid crystals having a screw axis with a pitch on the order to several um that does not absorb visible rays. Furthermore, the driving voltage of liquid crystals of this mode must be more than 20–25 volts which is incompatible with CMOS circuits that are most suitable for driving liquid crystals. It accordingly becomes necessary for the camera having batteries as a power source to include a built-in voltage boosting circuit which, as a practical matter, is a serious drawback as compared to a DSM (Dynamic Scattering Mode or DS mode) liquid crystal, as hereafter explained.

On the other hand, only one type of DS mode is given as a current effect mode and its indication states are determined by the effect of light dispersion.

Thus, various types of liquid crystal indicators have been proposed according to the orientation of their molecules, but only two types—TN mode in an electric field effect crystal and DS mode in a current effect crystal—have been put to practical use and are on the market, while other modes are still in the research phase of development. A current effect mode liquid crystal is represented by an Nn liquid crystal having a moderate ion nature and when a sufficiently large electric field is impressed thereon, current flows in the liquid crystal; the crystal itself thereby enters a turbulent flow state with the action of both a dielectric torque and an electrical conduction torque such that light is intensively dispersed and an indication is made by the difference in contrast between the portion where the electric field is impressed and the portion where no such field is impressed. A current effect mode liquid crystal is so constructed that a pair of NESA-glass plates provided with a transparent electrode are held at a clearance of about 10 um and an appropriate liquid crystal material (such as a schiff compound or an azo-compound) is enclosed therebetween. It is also possible to add additives thereto to promote a turbulent flow state.

This turbulent flow state is a flow of liquid crystal molecule groups of about 10 um in size. Thus, when used as a matte surface of the camera focusing screen and held between two pieces of flat and transparent NESA-glass, the liquid crystal advantageously displays its characteristics.

SUMMARY OF THE INVENTION

An object of this invention is to provide a camera wherein a current effect mode liquid crystal is used as a focusing screen. Another object of the invention is to provide a camera having an information indicating part in which an electric field effect mode liquid crystal is enclosed. The foregoing and other objects, novel features and advantages of the present invention will become more apparent from the following detailed description of preferred embodiments thereof when taken in conjunction with the accompanying drawings.

DETAILED DESCRIPTION OF THE PREFERRED EMBODIMENTS

Figure 1:
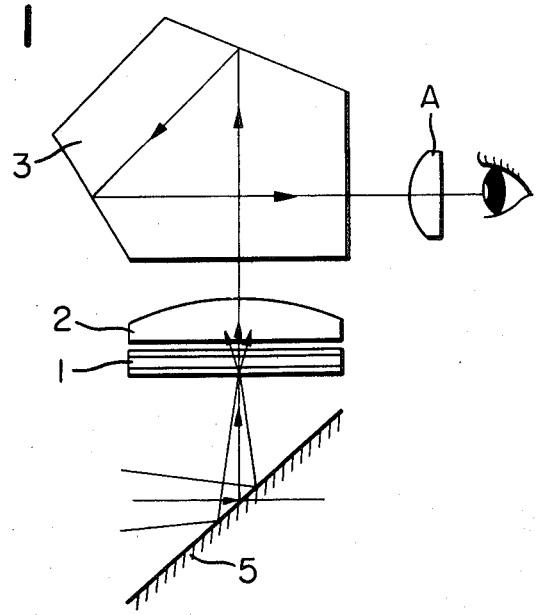
FIG. 1 is a sectional view of the viewfinder part of the present invention.

FIG. 1 is a finder part of a single-lens reflex camera comprising a current effect mode liquid crystal cell 1 to be used as a focusing screen, a condenser lens or Fresnel lens 2, a pentagonal prism 3, an eyepiece 4 and a reflecting mirror 5. If the light reflected at reflecting mirror 5 is in the in-focus state and a moderate current is flowing in liquid crystal focusing screen 1, the reflected light is moderately dispersed by the turbulent flow and cloudiness of the liquid crystal and an image can be seen clearly through condenser lens 2, pentagonal prism 3 and eyepiece 4. If, on the other hand, the reflected light is out of focus, the light dispersed by the liquid crystal is scattered such that no image or merely a blurred image is seen, and focus detection is thereby possible.

Figure 2:
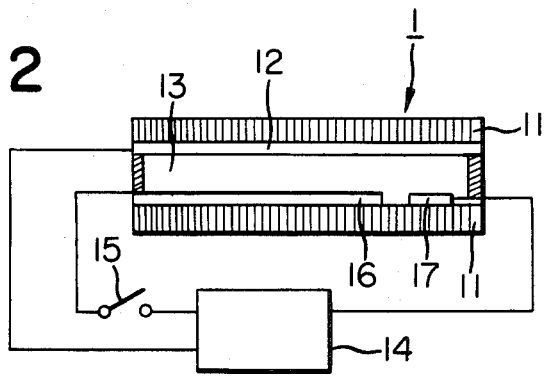
FIG. 2 is a sectional view of a focusing screen formed of a current effect mode liquid crystal cell.

In FIG. 2, liquid crystal cell 1 is seen to comprise transparent flat substances 11 (of glass or the like) which are spaced apart by a small gap, a common transparent electrode 12, a transparent electrode 16 to form a focusing screen, a transparent electrode 17 to form an indication part, a current effect mode liquid crystal 13 disposed in the space, an electric power source 14 wired to the electrodes, and a changeover switch 15. The three electrodes 12, 16 and 17 are mounted on the inner surfaces of the transparent substances 11, as shown.

Figure 3:
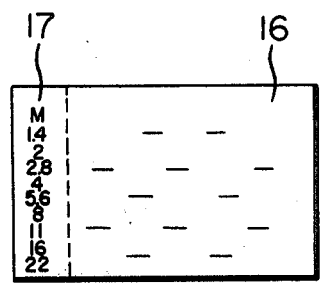
FIGS. 3 and 4 are plan views illustrating examples of focusing screens.
Figure 4:
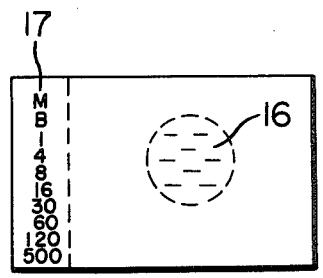

For photographing, with switch 15 OFF, no voltage is impressed on the electrodes and liquid crystal cell 1 is in its transparent state such that the picture can be composed with a bright frame appearing in the viewfinder. With switch 15 ON, the liquid crystal is brought into its turbulent flow state of cloudiness and focusing is thereby possible. FIG. 3 is a plan view of FIG. 2 and, on the focusing screen, a uniform transparent electrode 16 is disposed. In the information indication part 17, information such as the exposure value for manual operation is arranged and a white color indication is available by impressing the voltage on only the required portion. However, it should be understood that this arrangement is by way of example only and any pattern for the composition of the focusing screen and for the information indication part can be provided as occasion demands. FIG. 4 illustrates a focusing screen with a circular matte surface and an indication part in which the shutter speed is shown.

Figure 5:
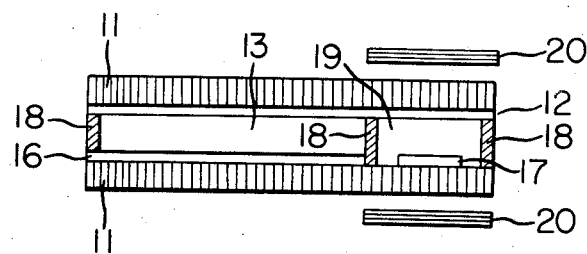
FIG. 5 is a sectional view of a focusing screen formed of the combination of a current effect mode liquid crystal cell and an electric field effect mode liquid crystal cell.
Figure 6:
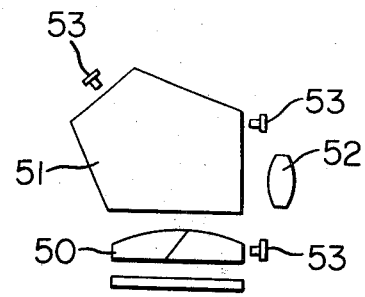
FIG. 6 shows an arrangement of light receiving elements.

In FIG. 5, another example of a liquid crystal cell 1 is shown. Where it is desired to draw particular attention to the indication part for cautions or warnings or the like by providing that part with distinctive colorations, the focusing screen part and the indication part may be separated or divided by a partition wall 18, a current effect mode liquid crystal 13 may be enclosed in the focusing screen part, and an electric field effect mode liquid crystal 19 may be enclosed in the indication part. A color filter or polarizing plate 20 (with a TN mode liquid crystal) or dyes added to the cell (with a GH mode liquid crystal) can be utilized to provide the coloration. Furthermore, an electrochromic substance that has recently been put to practical use can easily be used as an indication part material in the present invention since its color is vivid and the cell structure is the same as that of the liquid crystal.

However, liquid crystals and electrochromics do not themselves emit light and, when the brightness of the subject or scene to be photographed is dim, the field of view in the finder is likewise dim and the indication is hard to see. It is therefore necessary to provide an illumination element for situations in which the subject is dim and, for this purpose, simple lighting from the side of the focusing screen by an LED tungsten lamp is sufficient.

For purposes of discussion and in order to fully appreciate and understand the invention, the same will be considered in the context of a camera having an exposure control mechanism wherein the brightness of the subject is measured using the light that passes through the focusing screen. When the light receiving element is arranged near the condenser lens 50, the pentagonal prism 51 or the eyepiece 52, it is necessary to bias the brightness measurement and correspondingly control the exposure in accordance with whether a voltage is then being impressed on the liquid crystal focusing screen since the amount of light that passes through the lens and focusing screen differs—by a fixed amount—in each case. Thus, the amounts of light that are passed through the screen in its cloudy state during voltage impression on the liquid crystal focusing screen, and in the state of transparency when no voltage is impressed thereon, differ at a fixed rate independent of the amount of light incident upon the screen.

Figure 7:
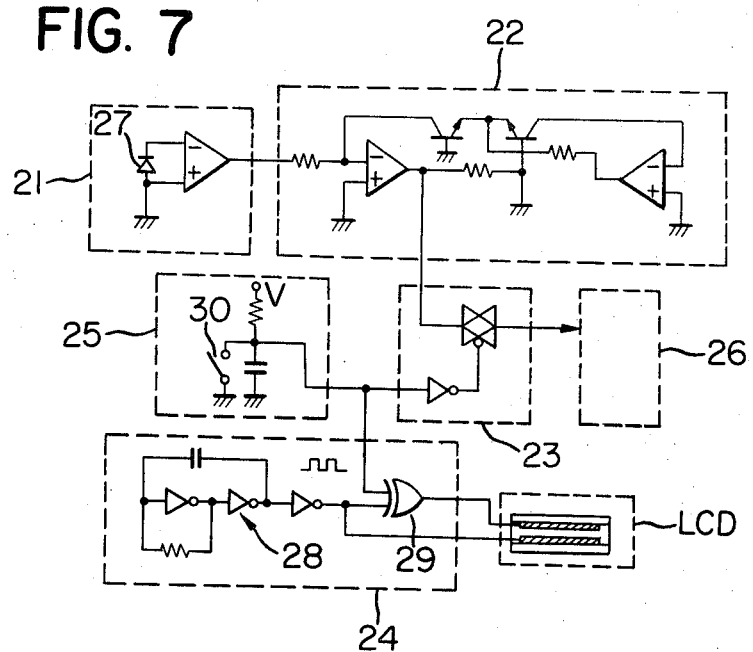
FIG. 7 shows a circuit for exposure control.

FIG. 7 illustrates a circuit composed of a linear or CMOS integrated circuit wherein a voltage is generated, in proportion to the amount of light measured, by a light-receiving circuit 21. Circuit 21 contains a silicon photodiode 27 as a light measurement light-receiving element to control the exposure, receiving light reflected from the subject after passage through the liquid crystal focusing screen. The output signal from light-receiving circuit 21 is logarithmically compressed by a logarithmic amplification circuit 22 of APEX mode that is convenient for exposure control and this logarithmically compressed signal is fed to an exposure control circuit 26 for effecting exposure control. In this example, an analogue switch 23 is disposed between logarithmic amplification circuit 22 and exposure control circuit 26 and is maintained in its conductive state only during periods of voltage impression on the liquid crystal focusing screen. Thus, an arrangement is provided so that the existence or nonexistence of voltage impression on the liquid crystal focusing screen at the time of light measurement exposure control appropriately biases switch 23 to feed or not feed, respectively, the exposure determination to the exposure control circuit.

In the liquid crystal driving circuit 24, an inverter circuit 28 is an unstable oscillation circuit that generates a direct current square wave with the aid of the condenser and the resistor connected therein. In control circuit 25, the logic level is low with a switch 30 ON and is at high level when switch 30 is in its OFF state. In its OFF state, the high level output of switch 30 is applied to one input of an exclusive logical sum circuit 29 and an alternating current square wave suitable for liquid crystal driving is impressed on the crystal because a direct current square wave of opposite or reverse phase is generated by circuit 29 when its other input is held at high level. The high level signal applied to the control input of analogue switch 23 maintains switch 23 in its conductive state such that the light measurement signal is directed to the exposure control circuit.

Figure 8:
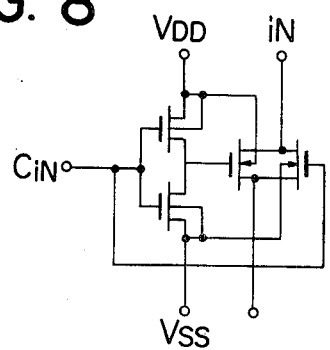
FIG. 8 shows an analogue switch consisting of an FET.

When switch 30 is in its ON state, on the other hand, a low level signal is applied to one input of exclusive logical sum circuit 29 and the output therefrom is a direct current square wave of the same phase as the direct current square wave fed to its other input. As a consequence, substantially no voltage is impressed on the liquid crystal and, at the same time, analogue switch 23 becomes non-conductive such that no light measurement signal is passed to exposure control circuit 26. Analogue switch 23 may be composed of an FET device as shown in FIG. 8.

Figure 9:
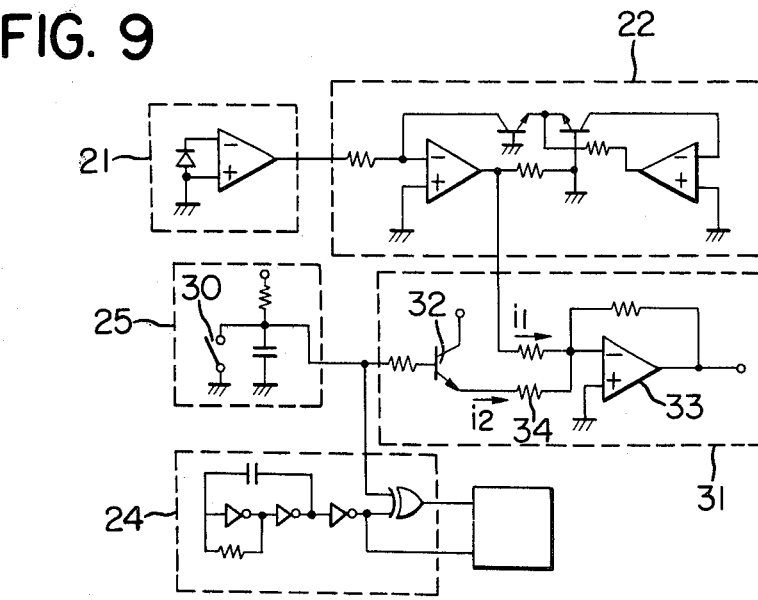
FIG. 9 shows a compensation circuit for exposure control.

Instead of biasing the light measurement in accordance with liquid crystal driving, compensation of the light amount measured may be provided by compensating the light measurement signal fed to the exposure control circuit in accordance with the existence or non-existence of voltage impression on the liquid crystal focusing screen. One circuit for providing such compensation is shown in FIG. 9. This circuit includes a compensation circuit 31 in place of analogue switch 23 in FIG. 7. Compensation circuit 31 is an adding circuit composed of a conventional linear integrated circuit (IC) 33, the output voltage of which is generated in response to the amount of current that enters one terminal thereof. When switch 30 is in its OFF state, a high level signal is generated and a compensation current i2 flows from a compensation power source e to the linear IC 33 through conducting transistor 32. The magnitude of current i2 can be adjusted to a fixed value by appropriate selection of the compensation power source e or the resistor 34.

Since the signal representative of the light that passes through the focusing screen is of a value converted logarithmically from light measurement circuit 21 by logarithmic amplification circuit 22, the difference for a given light input between the measurement obtained in the cloudy and in the transparent states of the focusing screen can be converted to a difference of fixed value regardless of the amount of light incident on the screen. As previously discussed, when a voltage is impressed on the liquid crystal resulting in a state of cloudiness thereof (with the switch 30 OFF), the light measurement output decreases. This decrease can, however, be compensated—and thereby adjusted to yield the same measurement that would be obtained in the transparent state of the liquid crystal—by an inflow of compensation current i2. When switch 30 is in its ON state, on the other hand, transistor 32 becomes nonconductive and no compensation current i2 flows; no compensation accordingly provided in the transparent state of the liquid crystal, and exposure control is effected on the basis of light measurement signal current i1 alone.

In this manner, the inconvenience in light measurement exposure control normally caused by the use of a liquid crystal focusing screen can easily be avoided and exposure control can be accomplished with the same accuracy available with conventional light measurement at the focusing screen.

Furthermore, by a combination of an automatic focus detecting mechanism and a liquid crystal focusing screen, it is possible to attain a more useful camera. This combination arrangement comtemplates combining the output of an automatic focus detecting device with the voltage impressing means for a liquid crystal focusing screen, and so constructing the finder system that the transparent state of the liquid crystal is provided while the focus detecting device generates the out-of-focus signal (the so-called aerial image type finder system), and an operating voltage is impressed on the liquid crystal to produce a matte surface thereon while the focus detecting device generates the in-focus signal. In this manner it is always possible to view and adjust the photographic composition in the finder.

Figure 10:
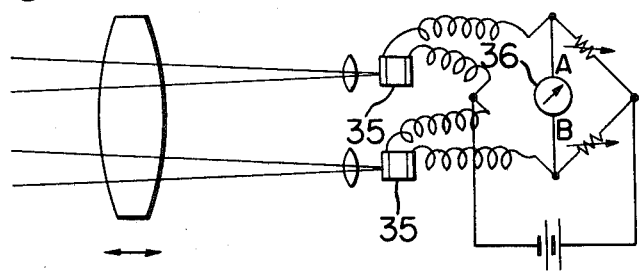
FIG. 10 shows a partially diagrammatic arrangement for an automatic focus detecting device.

An arrangement for use with the focus detecting mechanism described in "Focus Detecting Device" (Japanese Laid-Open Patent Publication No. 147430/1977), by way of example, is shown in FIG. 10. A pair of light receiving elements 35 are illuminated by light from the subject and the relative distribution of the image on each of the elements is measured. In the in-focus state, the image distribution on each of the elements agrees with the other such that the outputs of both elements are equal and, therefore, no electric current flows through the galvanometer 36 in a bridge circuit. In the out-of-focus state, on the other hand, the image distribution on each of the elements differs whereby the outputs of both elements differ, and an electric current accordingly flows through galvanometer 36. It is thereby possible to discriminate between the in-focus and the out-of-focus states.

Using a so-called window comparator in place of the galvanometer, a high level signal may be applied to the liquid crystal driving circuit when the current value (the differential in the outputs of elements 35) is zero—namely, the in-focus state—such that the voltage is impressed on both the direct current square wave oscillation circuit and the liquid crystal whereby a matte surface in the cloudy state of the crystal is obtained.

Figure 11:
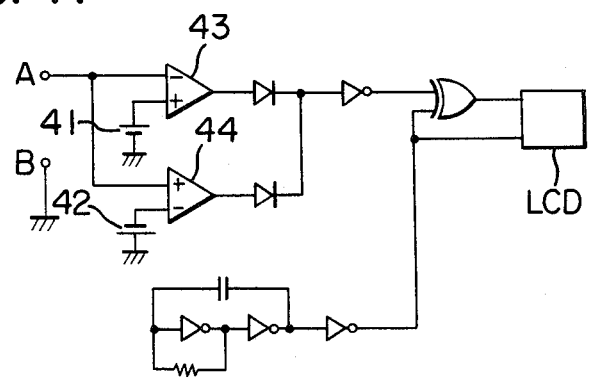
FIG. 11 shows another circuit for use in the arrangement of FIG. 10, wherein a window comparator replaces the galvanometer.

FIG. 11 shows a circuit for this purpose wherein the terminals A, B are connected to the galvanometer terminals (FIG. 10) of the focus detecting device. Power sources 41, 42 generate the threshold voltages of positive and negative voltage, respectively, that are applied to comparators 43, 44 and hysteresis is formed in order to stabilize the output therefrom. Thus, the outputs of comparators 43, 44 in the in-focus state are both at low logic level which is converted to high logic level by an inverter circuit so that the liquid crystal driving circuit can impress its output on the liquid crystal. In the out-of-focus state, on the other hand, the output of one of the comparators 43, 44 is high, which is converted to a low logic level by the inverter, so that the output of the liquid crystal driving circuit is not applied to the liquid crystal.

It is thereby possible to impress the operating voltage on the liquid crystal focusing screen, by using the in-focus signal, to produde a matte surface on the screen. On the other hand, by providing a finder system wherein a matte surface is produced by impression of operating voltage to the screen while an out-of-focus signal is being output by the focus detecting device, the photographer may judge the in-focus or the out-of-focus state by making the liquid crystal transparent while the in-focus signal is generated.

Thus, using a current effect mode liquid crystal focusing screen, it is possible to provide a matte surface type focusing screen having a bright field of view in the finder to enable the photographer to selectively compose the photograph, while indicating relevant exposure information with the same liquid crystal cell. As a consequence, the camera finder that has, in the past, been complex may now be simplified. Furthermore, in combination with an exposure mechanism and/or an automatic focus detecting mechanism, a function that has not heretofore been seen in conventional cameras can be added, rendering the camera more easily usable and facilitating the production of clear photographs.

What is claimed is:

1. In a camera including a source of electric voltage and in which light reflected from a subject to be photographed is passed through the focusing screen, the focusing screen comprising a pair of substantially flat, transparent members spaced apart in substantially parallel relation so as to dispose a surface of each said member in confrontingly opposed relation to said surface of the other of said members, at least a transparent electrode mounted on each of said confrontingly opposed surfaces, and a current effect mode liquid crystal disposed in the space between said members, a changeover switch movable between a first position and a second position, means connecting said electrodes of the focusing screen to the electric voltage source through said changeover switch so that operating voltage is applied to said focusing screen by impression on said electrodes in said second position of the changeover switch but not in said first position thereof, means for measuring the amount of light passed through the focusing screen and for outputting a signal in accordance with said measurement, an exposure control circuit, and switching means connected to said changeover switch and said exposure control circuit for causing said output signal of the light measuring means to be transmitted to said exposure control circuit only when said changeover switch is in said second position thereof whereby operating voltage is applied to said focusing screen.

2. In a camera including a source of electric voltage and in which light reflected from a subject to be photographed is passed through the focusing screen, the focusing screen comprising a pair of substantially flat, transparent members spaced apart in substantially parallel relation so as to dispose a surface of each said member in confrontingly opposed relation to said surface of the other of said members, at least a transparent electrode mounted on each of said confrontingly opposed surfaces, and a current effect mode liquid crystal disposed in the space between said members, a changeover switch movable between a first position and a second position, means connecting said electrodes of the focusing screen to the electric voltage source through said changeover switch so that operating voltage is applied to said focusing screen by impression on said electrodes in said second position of the changeover switch but not in said first position thereof, means for receiving the light passed through said focusing screen and for outputting an electric current signal which varies in accordance with the amount of light received thereby, an exposure control circuit, and a compensation circuit comprising first control means for outputting a voltage signal that varies in accordance with the magnitude of an electric current input to said first control means, said output current signal of said receiving means being applied to said current input of the first control means, and second control means operable in a first mode when the changeover switch is in said second position thereof to apply a compensation current to said current input of the first control means and in a second mode when the changeover switch is in said first position thereof to prevent the application of said compensation current to the current input of said first control means, and the voltage output signal of said first control means being applied to said exposure control circuit, whereby the magnitude of the voltage applied to said exposure control circuit is dependent upon the amount of light reflected from the subject to be photographed, but is independent of whether operating voltage is or is not applied to said focusing screen due to the additional compensating current inputted to said first control means when operating voltage is applied to said screen.

* * * * *